Feb. 26, 1963  J. T. STOCKDALE ET AL  3,079,322
FUEL ELEMENTS FOR NUCLEAR REACTORS
Filed July 14, 1961
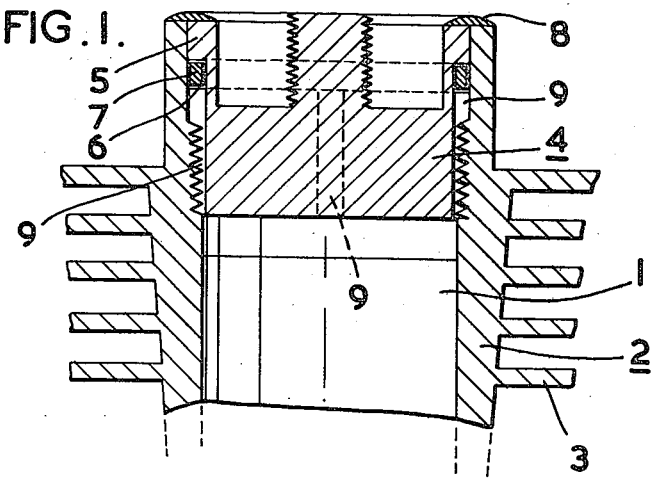
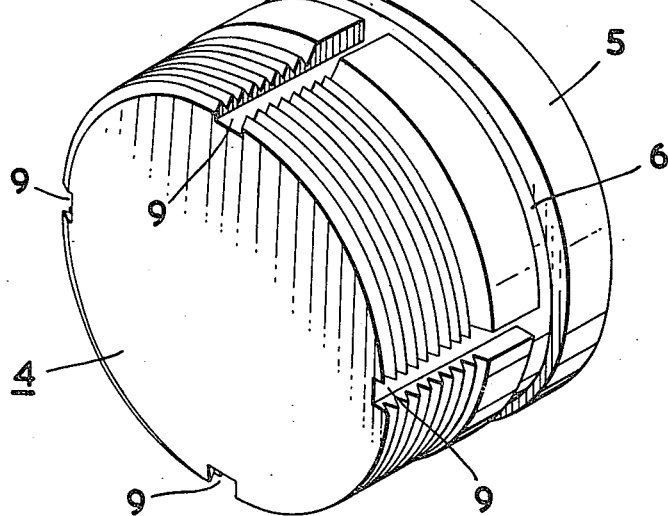

3,079,322
FUEL ELEMENTS FOR NUCLEAR REACTORS
James Thomas Stockdale, Preston, and Alan Frederick Taylor, Lea, Preston, England, assignors to United Kingdom Atomic Energy Authority, London, England
Filed July 14, 1961, Ser. No. 124,135
Claims priority, application Great Britain July 18, 1960
2 Claims. (Cl. 204—193.2)

This invention relates to nuclear reactor fuel elements of the type comprising a nuclear fuel member contained in a protective sheath.

Such fuel elements customarily have the sheaths closed at each of the ends by a screwed end cap having a plain skirt which is a close fit in the end of the sheath, a circumferential sealing weld being made between the end of the sheath and the skirt of the end cap. If the sealing weld between the sheath and end cap is faulty or develops a fault during use of the fuel element in a nuclear reactor then ingress of reactor coolant gas into the sheath is possible with consequent oxidation of the fissile fuel member contained therein. In order to give early warning of the presence of a fuel element having such a faulty end sealing weld, an insert of nuclear fuel material is located in a circumferential groove in the skirt of each end cap so that the insert of nuclear fuel material (which may comprise a uranium strip) is trapped between the skirt of the end cap and the sheath. By this means should the sealing weld between the skirt of the end cap and the sheath develop a fault then fission products generated in the insert of nuclear fuel material can escape into the reactor coolant gas and are detected by apparatus external to the reactor core structure to provide indication of the presence of the faulty fuel element.

It has been found, however, that in the welding of sheath and end cap the occurrence of faulty welds is greater than in fuel elements not having the insert of nuclear fuel material. It is thought that this may be caused by gas entrapped in the circumferential groove which expands due to the heat of the welding operation and in escaping between the skirt of the end cap and the sheath can give rise to blow holes in the molten weld metal.

According to the present invention a nuclear reactor fuel element comprising a nuclear fuel member contained within a protective sheath of tubular form closed at each end by an end cap which is a close fit in the end of the sheath, a circumferential groove being defined between the end of the sheath and the end cap, said groove containing an insert of nuclear fuel material has a passageway defined between the end of the sheath and the end cap for venting the circumferential groove to the interior of the fuel element sheath when the end cap is located closing the end of the fuel element sheath.

In a preferred form of the invention the end cap is provided with one or more longitudinal grooves connecting the circumferential groove with the end of the end cap such that when the end cap is located closing the end of the fuel element sheath the longitudinal grooves of the end cap connect the circumferential grooves with the interior of the fuel element sheath.

One embodiment of the invention will now be described by way of example with reference to the accompanying drawings in which:

FIGURE 1 is a longitudinal sectional elevation.
FIGURE 2 is a detail of FIGURE 1 in isometric form.

In the drawing there is shown one end of a nuclear reactor fuel element comprising a cylindrical uranium rod enclosed in a magnesium alloy sheath 2 having circumferential heat transfer fins 3. The end of the sheath 2 is closed by a threaded end cap 4 having a plain skirt 5 which is a close fit in the end of the sheath 2. A circumferential groove 6 around the skirt 5 contains a strip of uranium 7 and a circumferential sealing weld 8 is made between the end of the sheath 2 and the skirt 5 of the end cap 4. As shown particularly by FIGURE 2, longitudinal grooves 9 in the end cap 4 connect the circumferential groove 6 with the threaded end of the end cap. The grooves 9 are four in number and equispaced round the periphery of the end cap. When the end cap 4 is located closing the end of the sheath 2, as shown in FIGURE 1, the longitudinal grooves 9 connect the circumferential groove 6 with the interior of the sheath 2 so that on making the sealing weld 8 any gas entrapped in the circumferential groove 6 on expanding due to heating can escape through the longitudinal grooves 9 into the sheath 2 and, therefore, does not give rise to blow holes in the sealing weld 8.

We claim:
1. A nuclear reactor fuel element comprising a nuclear fuel member contained in a protective sheath of tubular form and closed at each end by an end cap which is a close fit in the end of the sheath, a circumferential groove being defined between the end of the sheath and the end cap, said circumferential groove containing an insert of nuclear fuel material characterised in that a passageway is defined between the end of the fuel element sheath and the end cap for venting the circumferential groove to the interior of the fuel element sheath when the end cap is located closing the end of the fuel element sheath.

2. A nuclear reactor fuel element as claimed in claim 1, wherein one or more longitudinal grooves are defined in said end cap connecting the circumferential groove with the end of the end cap such that when the end cap is located closing the end of the fuel element sheath the longitudinal grooves in the end cap connect the circumferential groove with the interior of the fuel element sheath.

References Cited in the file of this patent
UNITED STATES PATENTS
3,037,924    Creutz _____ June 5, 1962

OTHER REFERENCES
Hausner et al.: Nuclear Fuel Elements, November 1959, pages 112 and 113.